United States Patent
Lee et al.

(10) Patent No.: US 11,429,978 B2
(45) Date of Patent: Aug. 30, 2022

(54) DELIVERY STATUS MANAGEMENT METHOD AND ELECTRONIC APPARATUS PERFORMING THE SAME

(71) Applicant: Coupang Corp., Seoul (KR)

(72) Inventors: Yul Hee Lee, Seoul (KR); Bo Ra Moon, Seoul (KR); Young Soo Lim, Seoul (KR); Tae Nyun Kim, Seoul (KR); Yoo Cheol Na, Seoul (KR); Jeong Ho Pi, Seoul (KR); Sang Seok Lee, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/016,183

(22) Filed: Sep. 9, 2020

(65) Prior Publication Data
US 2021/0406892 A1    Dec. 30, 2021

(30) Foreign Application Priority Data

Jun. 24, 2020  (KR) .................. 10-2020-0077228

(51) Int. Cl.
*G06Q 10/08* (2012.01)
*G06Q 20/40* (2012.01)
(Continued)

(52) U.S. Cl.
CPC ..... *G06Q 20/407* (2013.01); *G06Q 10/06312* (2013.01); *G06Q 10/0833* (2013.01); *G06Q 30/04* (2013.01)

(58) Field of Classification Search
CPC .......... G06Q 20/407; G06Q 10/06312; G06Q 10/08; G06Q 10/0833; G06Q 30/04
See application file for complete search history.

(56) References Cited

U.S. PATENT DOCUMENTS

| 8,473,326 B1 * | 6/2013 | Griffith .............. G06Q 10/0837 705/7.32 |
| 9,984,351 B1 | 5/2018 | Antony |

(Continued)

FOREIGN PATENT DOCUMENTS

| CN | 107153931 A | 9/2017 |
| CN | 108492063 A | 9/2018 |

(Continued)

OTHER PUBLICATIONS

Atletiko, Faizal Johan. "Development of Android Application for Courier Monitoring System." Procedia Computer Science 124 (2017): 759-766. (Year: 2017).*

(Continued)

*Primary Examiner* — Scott M Tungate
(74) *Attorney, Agent, or Firm* — Knobbe, Martens, Olson & Bear, LLP

(57) ABSTRACT

Provided is a delivery status management method performed by an electronic apparatus. The delivery status management method includes transmitting information associated with an item to a courier terminal, receiving information associated with a delivery progress status of the item from the courier terminal, and, when the information associated with the delivery progress status corresponds to a first type, performing a refund procedure for the item. According to the present disclosure, it is possible to provide a delivery status management method by which a refund caused by interruption of a delivery is not delayed and a refund procedure is performed quickly to a customer upon the interruption of the delivery.

14 Claims, 11 Drawing Sheets

(51) Int. Cl.
*G06Q 10/06* (2012.01)
*G06Q 30/04* (2012.01)

(56) References Cited

U.S. PATENT DOCUMENTS

| | | | | |
|---|---|---|---|---|
| 2010/0324959 | A1* | 12/2010 | Templeton | G06Q 10/087 705/334 |
| 2014/0201001 | A1* | 7/2014 | Rellas | G06Q 30/0261 705/14.58 |
| 2016/0104112 | A1* | 4/2016 | Gorlin | G06Q 10/08355 705/338 |
| 2017/0262790 | A1* | 9/2017 | Khasis | G08G 1/0116 |
| 2019/0019146 | A1* | 1/2019 | Chraibi | G08G 1/202 |
| 2020/0302385 | A1 | 9/2020 | Rehn | |

FOREIGN PATENT DOCUMENTS

| | | |
|---|---|---|
| CN | 110796405 A | 2/2020 |
| JP | 2002-189974 A | 7/2002 |
| JP | 2002-216061 A | 8/2002 |
| JP | 2002-255351 A | 9/2002 |
| JP | 2002-308436 A | 10/2002 |
| JP | 2002-230454 A | 8/2018 |
| JP | 2019-016157 A | 1/2019 |
| JP | 2019-082903 A | 5/2019 |
| KR | 10-2016-0008422 A | 1/2016 |
| KR | 10-2018-0031263 A | 3/2018 |
| KR | 10-2018-0056258 A | 5/2018 |
| KR | 10-2019-0035152 A | 4/2019 |
| KR | 10-1955527 B1 | 5/2019 |
| KR | 10-2082259 B1 | 2/2020 |
| KR | 10-2020-0062662 A | 6/2020 |
| KR | 10-2020-0065249 A | 6/2020 |
| KR | 10-2020-0077228 | 3/2021 |
| WO | WO 2019/045546 A1 | 3/2019 |

OTHER PUBLICATIONS

NAVER blog, Coupang Flex App Usage Guide dated Nov. 21, 2018.
Yonhap News, "Are there many reasons for cancellation of 'disaster fund donation by mistake'? (Comprehensive 2 reports)" May 12, 2020.
International Search Report issued in PCT/KR2020/009491 dated Mar. 22, 2021.

* cited by examiner

DELIVERY STATUS MANAGEMENT METHOD AND ELECTRONIC APPARATUS PERFORMING THE SAME

BACKGROUND

Technical Field

The present disclosure relates to a method for managing a delivery status of an ordered item, and an electronic apparatus performing the same.

Description of the Related Art

As the use of e-commerce is universal and more and more people purchase items on the Internet, a quick delivery of an item has been considered more important. However, when a courier delivers an item, the delivery may be delayed or interrupted for various reasons. In this case, there are problems that an exact reason for the delayed or interrupted is not provided to a customer and that a refund procedure is delayed even when a refund is made due to the interrupted delivery. For example, when the delivery is interrupted, the customer is notified that the delivery is interrupted due to the rejection of receipt, even if the customer has not refused to receive the delivered item, and thus, the exact reason for the interrupted delivery is not informed to the customer. In addition, in the case of a refund due to the interrupted delivery, the refund is delayed even though the courier can make a refund immediately because the courier holds the item.

SUMMARY

Technical Goals

Embodiments provide a method for managing a delivery status of an ordered item and an electronic apparatus performing the same. Technical coals of the present disclosure are not limited to the above-mentioned goal, and other goals and advantages of the present disclosure which are not mentioned herein could be understood by the following description and could be clearly understood by embodiments of the present disclosure. In addition, it could be seen that the goals and advantages of the present disclosure can be achieved by means described in the claims and a combination thereof.

Technical Solutions

According to an embodiment, there is provided a delivery status management method performed by an electronic apparatus, the method including transmitting information associated with an item to a courier terminal, receiving information associated with a delivery progress status of the item from the courier terminal, and, when the information associated with the delivery progress status corresponds to a first type, performing a refund procedure for the item.

According to an embodiment, the information corresponding to the first type may include at least one of: information indicating a case where the buyer has refused to receive the item; information indicating a case where a delivery address of the item is a wrong address; or information indicating a case where a delivery address of the item corresponds to a restricted area.

According to an embodiment, the information associated with the delivery progress status corresponding to the first type may be input on a screen of the courier terminal, the screen on which delivery address information of the item is displayed.

According to an embodiment, the performing of the refund procedure may include transmitting information on or regarding a refund to a buyer of the item.

According to an embodiment, when the information associated with the delivery progress status corresponds to the first type, an instruction of collecting the item may be transmitted to the courier terminal.

According to an embodiment, the information associated with the delivery progress status corresponding to the first type may be selected on an input screen of the courier terminal, the input screen which is different from an input screen for a delivery progress status corresponding to a second type.

According to an embodiment, when the information associated with the delivery progress status corresponds to a second type, the item may be processed to be delivered on a next shift.

According to an embodiment, the information corresponding to the second type may include at least one of: information indicating a case where a courier is not allowed to enter; information indicating a case where the courier has insufficient time to deliver the item; or information indicating a case where the courier has misclassified the item or misloaded the item (e.g., loaded a different or incorrect item for delivery).

According to an embodiment, the method may include, when the information associated with the delivery progress status corresponds to a third type, performing a refund procedure for the item, and the information corresponding to the third type may include information indicating a case where cancellation is confirmed by the buyer before the item, of which an order is requested to cancel by the buyer, is delivered to the buyer.

According to an embodiment, the performing of the refund procedure may include comparing a number of times of the information associated with the delivery progress status with a reference value, identifying the information associated with the delivery progress status as a first type based on a result of the comparison, and, when the information associated with the delivery status corresponds to the first type, performing the refund procedure.

According to an embodiment, there is provided a delivery status management method performed by a courier terminal, the method including displaying information associated with an item, receiving information associated with a delivery progress status of the item, and, when the information associated with the delivery progress status corresponds to a first type, transmitting information corresponding to the first type to an electronic apparatus so that a refund procedure for the item is performed.

According to an embodiment, the information corresponding to the first type may include at least one of: information indicating a case where the buyer has refused to receive; information indicating a case where a delivery address of the item is a wrong address; or information indicating a case where a delivery address of the item corresponds to a restricted area.

According to an embodiment, the method may include, when the information associated with the delivery progress status corresponds to a second type, transmitting information corresponding to the second type to the electronic apparatus so that the item is delivered on a next shift, and the information corresponding to the second type may include at least one of: information indicating a case where a courier is not allowed to enter; information indicating a case where the courier has insufficient time to deliver the item; or information indicating a case where the courier has misclassified the item or misloaded the item (e.g., the loaded item is a different item).

According to an embodiment, the method may further include, when the information associated with the delivery progress status corresponds to the third type, transmitting the information corresponding to the third type to the electronic apparatus so that a refund procedure for the item is performed, and the information corresponding to the third type may include information indicating a case where cancellation is confirmed by the buyer before the item, of which an order is requested to cancel by the buyer, is delivered to the buyer.

According to an embodiment, there is provided a non-transitory computer-readable recording medium having recorded thereon a program, which performs the above-described delivery status management method.

Effects

According to the present disclosure, it is possible to provide a method for providing a customer with an accurate reason for an unavailable delivery when the delivery is not allowed for a reason other than a customer's refusal to receive.

In addition, according to the present disclosure, it is possible to provide a delivery status management method, the method by which a refund procedure due to an interrupted delivery is not delayed but rather performed quickly upon the interrupted delivery.

In addition, according to the present disclosure, it is possible to provide a delivery status management method, the method which provides a User Interface (UI) provided on an application to call a courier's attention, thereby improving convenience and accuracy of use of the courier.

Effects are not limited to the aforementioned effects, and other effects not mentioned will be clearly understood by those skilled in the art from the description of the claims.

DETAILED DESCRIPTION

Figure 1:
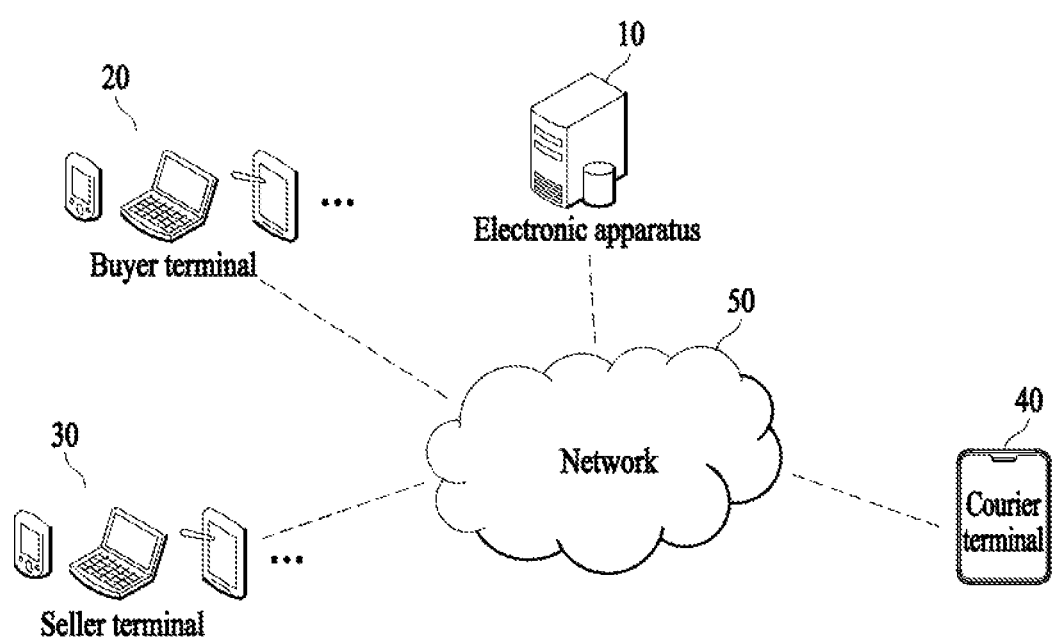
FIG. 1 illustrates an e-commerce system according to an embodiment.

Hereinafter, exemplary embodiments of the present disclosure will be described in detail with reference to the accompanying drawings so that those of ordinary skill in the art may easily implement the present disclosure. However, the present disclosure may be implemented in various different forms and is not limited to the exemplary embodiments described herein.

In the following description, a suffix such as "unit" may be used to refer to elements, and the use of such a suffix herein is merely intended to facilitate description of the specification, and the suffix itself is not intended to give any special meaning or function.

In order to clearly describe the present disclosure, parts irrelevant to the description are omitted, and like reference numerals designate like elements throughout the specification. In addition, some embodiments of the invention will be described in detail with reference to exemplary drawings. In adding reference numerals to elements of each drawing, the same elements may have the same reference numerals as much as possible even though they are shown in different drawings. In addition, in describing the present disclosure, when it is determined that the detailed description of the related well-known configuration or function may obscure the gist of the present disclosure, the detailed description may be omitted.

In describing elements of the exemplary embodiments of the present disclosure, terminologies such as first, second, A, B, (a), (b), and the like may be used. Such terms are used to distinguish an element from another element but a nature, an order, or the number of the elements is not limited by the terminology. If it is described that an element is "connected", "coupled", or "linked" to another element, it is understood that the element may be directly connected or coupled to the other element, but another element may be "interposed" between the elements or the elements may be "connected", "coupled", or "linked" by another element.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

Further, in implementing the present disclosure, the element can be described by being subdivided for convenience of explanation, but these elements may be implemented in a device or a module, or one element may be implemented by being distributed in a plurality of devices or modules.

FIG. 1 illustrates an e-commerce system according to an embodiment.

Referring to FIG. 1, an e-commerce system 1 may include an electronic apparatus 10, a buyer terminal 20, a seller terminal 30, and a courier terminal 40. In the e-commerce system 1 shown in FIG. 1, only the elements related to this embodiment are shown. Accordingly, it would be understood by one of ordinary skill in the art that general-purpose elements other than the elements shown in FIG. 1 may be further included.

The electronic apparatus 10, the buyer terminal 20, the seller terminal 30, and the courier terminal 40 may communicate with each other within a network 50. The network 50 includes a Local Area Network (LAN), a Wide Area Network (WAN), a Value Added Network (VAN), a mobile radio communication network, a satellite communication network, and a combination thereof, and the network is, in a broad sense, a data network via which elements of each network illustrated in FIG. 1 actively communicate with each other and may include wired Internet, wireless Internet, and a mobile wireless communication network. Wireless communication may include, for example, but not limited to, wireless LAN (Wi-Fi), Bluetooth, Bluetooth low energy (Bluetooth low energy), Zigbee, Wi-Fi Direct (WFD), Ultra Wideband (UWB), infrared communication (IrDA), Near Field Communication (NFC), and the like.

The buyer terminal 20 may receive buyer information involved in an order and a delivery request for an item that a buyer wants to purchase. Specifically, the buyer terminal 20 may provide a user interface displayed through an application to the buyer, and the buyer may input, based on the user interface, order information of an item and buyer information involved in a delivery request for the item to the buyer terminal 20. Item order information and buyer information, which are input to the buyer terminal 20, may be transmitted to the electronic apparatus 10.

The seller terminal 30 may acquire buyer information involved in an order and a delivery request for an item. Specifically, the seller terminal 30 may receive the item order information and the buyer information from the buyer terminal 20 over the network 50. Then, the seller may acquire invoice information of the item from the electronic apparatus 10 in order to process the order and the delivery of the item. For example, the seller may request the delivery of the item from the electronic apparatus 10 through the seller terminal 20, and the seller terminal 20 may acquire the invoice information of the item from the electronic apparatus 10.

The electronic apparatus 10 may provide a platform for an item delivery service. Specifically, the electronic apparatus 10 may provide an application for the item delivery service to the seller terminal 30 or the courier terminal 40, and the electronic apparatus 10 may execute the application to provide the item delivery service through the seller terminal 30 or the courier terminal 40 which is connected to the electronic apparatus 10. For example, the electronic apparatus 10 may be included in a server that provides the item delivery service. Upon the delivery request for the item being received from the seller terminal 30, the electronic apparatus 10 may allocate the delivery of the item through a courier terminal 40 of a courier selected from a plurality of couriers. In this case, the electronic apparatus 10 may provide information associated with the item to the courier terminal 40 of the selected courier to the courier terminal 40. Here, the information associated with the item is information necessary to deliver the item and may include, for example, an invoice number and buyer information. Here, the invoice number may be a unique number including information on or regarding all matters related to shipping the item, and the buyer information may include personal information of a buyer, such as the buyer's name, phone number, and address. In addition, the buyer information may include information on an address of a delivery destination at which the buyer wishes to receive the item. For example, the buyer information may include information on a postal code of the delivery destination.

The courier may be assigned by the electronic apparatus 10 to deliver the item using the courier terminal 40. Each courier has at least one unique courier terminal 40, and the courier terminal 40 may transmit information associated with a delivery progress status to the electronic apparatus 10, whereby associated information may be updated. The electronic apparatus 10 may acquire information associated with the courier terminal 40 using an application. For example, the electronic apparatus 10 may acquire location information and time information of the courier terminal 40.

More specific embodiments implemented in the electronic apparatus 10, the buyer terminal 20, the seller terminal 30, and the courier terminal 40 will be described in the following drawings.

Figure 2:
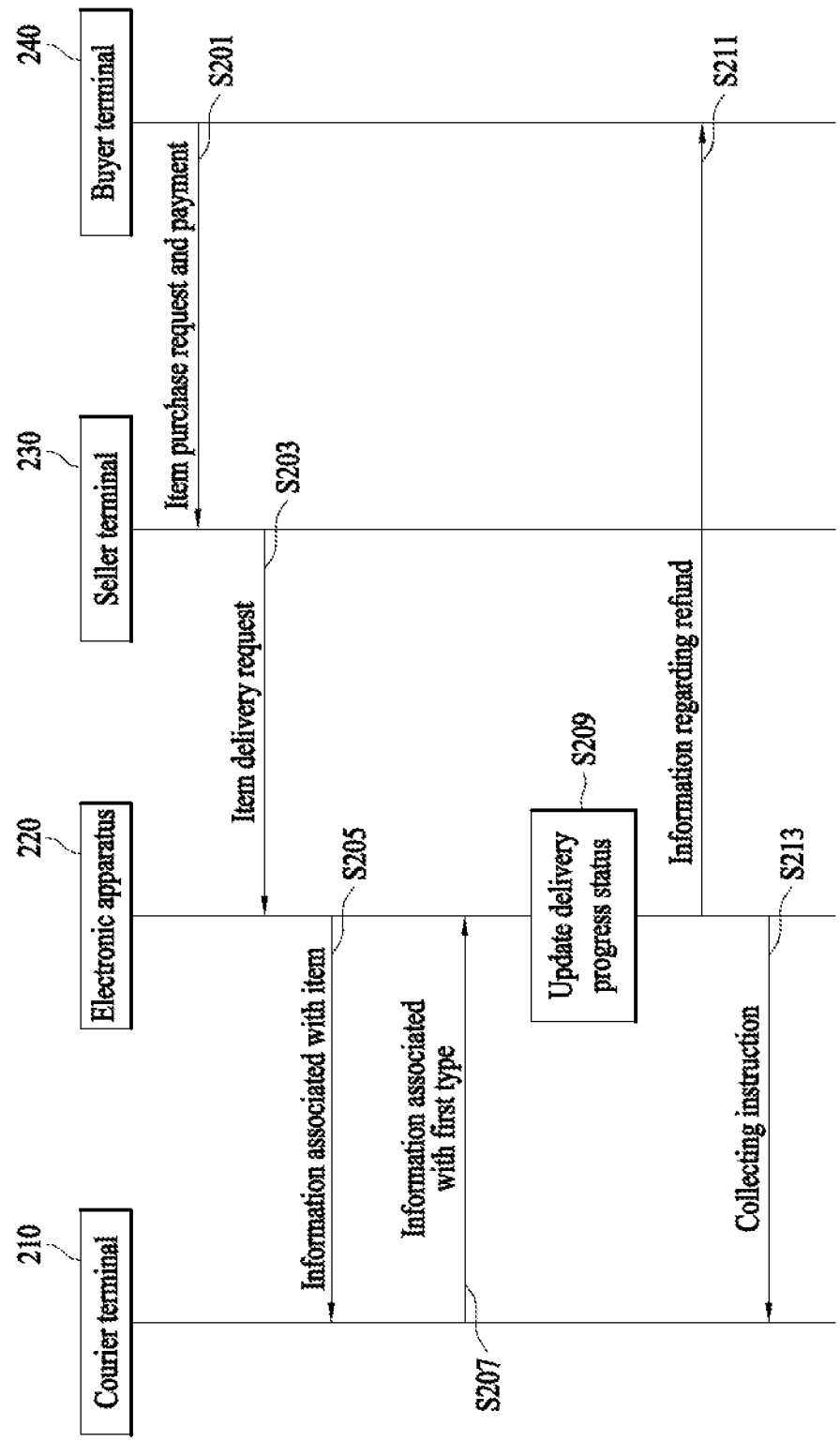
FIG. 2 illustrates a flowchart of a delivery status management method according to an embodiment.

FIG. 2 illustrates a flowchart of a delivery status management method according to an embodiment.

Referring to FIG. 2, a buyer may use a buyer terminal 240 to determine a desired item and proceed with payment for the item. That is, in operation S201, the buyer terminal 240 may transmit an item purchase request and payment information to a seller terminal 230.

In operation S203, using the seller terminal 230, a seller may identify the item requested to purchase and information associated with payment of the item and may transmit to an electronic apparatus 220 a delivery request for an item which is paid. In this case, the electronic apparatus 220 is a device connected to the seller terminal 230 to provide a delivery service of the item to the buyer, and may transmit an invoice number to the seller terminal 230 or the buyer terminal 240 upon the delivery request. Meanwhile, the embodiment is described such that the electronic apparatus 220 and the seller terminal 230 are configured as separate nodes, but they may be nodes that may be logically implemented in the same server.

In operation S205, the electronic apparatus 220 may transmit the information associated with the item to a courier terminal 210. Specifically, the electronic apparatus 220 may determine a courier suitable for delivering the item, which is requested to deliver, from among a plurality of couriers, and may provide the information associated with the item to the courier using the courier terminal 210. In this case, the information associated with the item is information necessary to deliver the item and may include at least one of, for example, an invoice number, a delivery address, an address input by the customer, a buyer name, or a buyer contact number.

In operation S207, the courier terminal 210 may transmit information associated with a first type to the electronic apparatus 220. Specifically, the courier who has identified the information associated with the item using the courier terminal 210 may deliver the item to the buyer using the associated information. At this point, the courier may input information associated with a delivery progress status of the item using the courier terminal 210, and the courier terminal 210 may transmit the received information to the electronic apparatus 220 through an application.

The information associated with the delivery progress status may include at least one of: information corresponding to a first type; information corresponding to a second type; or information corresponding to a third type. In this case, information associated with a delivery progress status corresponding to the first type may be selected by the courier on an input screen in the courier terminal 210, the input screen which is different from that of a delivery progress status corresponding to the second type. In addition, the information associated with the delivery progress status corresponding to the first type may be input by the courier on a screen of the courier terminal 210, on which delivery address information of the item is displayed. A process in which the courier inputs information associated with a delivery progress status of the item in the application displayed on the courier terminal 210 will be described in detail with reference to FIGS. 6 to 9 below.

Here, the information corresponding to the first type may include information associated with an interrupted delivery of the item. Here, the information corresponding to the first type may include, for example, information indicating a case where the buyer has refused to receive a delivered item, a case where it is not possible to find a delivery address because of the delivery address of the item is a wrong address, or a case where the item cannot be delivered because the delivery address is in a restricted area although the delivery address of the item is found. For example, the information corresponding to the first type may include information indicating a case where the buyer has met the courier in person and clearly refused to receive the item, a case where the buyer has clearly refused to receive the item by talking with the courier on the phone, a case where the delivery address is a wrong address and does not even exist, or a case where the delivery address is found but the courier is not allowed to enter because a ward is closed due to epidemic.

In operation S209, the electronic apparatus 220 may update the delivery progress status based on the information received from the courier terminal 210. Specifically, the electronic apparatus 220 may update the delivery progress status of the item to a first status. Here, the first status may correspond to a state in which the delivery of the item is interrupted.

When the delivery of the item is interrupted in response to the first type, the electronic apparatus may generate a return invoice for the item. For example, when the delivery is interrupted due to a wrong address, the electronic apparatus may automatically generate a return invoice for the corresponding item while updating the delivery progress status to the first status. The item with the return invoice generated is a target to be collected, and a collecting instruction may be transmitted from the electronic apparatus to the courier terminal as in operation S213 below.

In operation S211, the electronic apparatus 220 may perform a refund procedure for the item corresponding to the first status. No more delivery attempt is made when the delivery of the item is interrupted, and the electronic apparatus 220 may immediately transmit information on or regarding a refund to the buyer terminal 240. Therefore, the refund procedure may not be delayed, but rather performed quickly. For example, when the electronic apparatus 220 receives information associated with the first type from the courier terminal 210 due to the buyer's refusal of receive, the electronic apparatus 220 may transmit a refund guide message to the buyer terminal 240 while updating the delivery progress status to an interrupted delivery. In this case, the refund guide message may include at least one of order information, a reason for the refund, or a refund period. In addition, the electronic apparatus 220 may provide information for performing the refund procedure to the seller terminal 230.

In operation S213, the electronic apparatus 220 may transmit a collecting instruction for the item to the courier terminal 210. Specifically, when the electronic apparatus 220 receives the information associated with the first type from the courier terminal 210, the return invoice for the item may be automatically generated. The electronic apparatus 220 may transmit a collecting instruction to the courier terminal 210 in response to the return invoice, and the courier may input confirmation of collection to the courier terminal 210 according to the collecting instruction.

According to an embodiment, the electronic apparatus 220 may monitor a location of the courier terminal 210 through an application. For example, a location identified through a location sensor embedded in the courier terminal 210 may be monitored by the electronic apparatus 220 through the application. In this case, when the location of the courier terminal 210 moves away from the delivery address in a state in which the collection is not confirmed, the electronic apparatus 220 may transmit a notification message to the courier terminal 210 in consideration of a distance and a time. For example, if the location of the courier terminal 210 moves away from the delivery address in a state in which the collection is not confirmed, a first-level notification message (e.g., sound), a second-level notification message (e.g., vibration), or a third-level notification message (e.g., sound and vibration) may be transmitted. If the courier does not collect an item and moves away from the delivery address even though a notification message is transmitted from the electronic apparatus 220 to the courier terminal 210, the electronic apparatus 220 may identify whether a different courier is able to collect the item. When the different courier is able to collect the item, the electronic apparatus 220 may transmit information associated with the collection to the different courier who is located near the delivery address.

Figure 3:
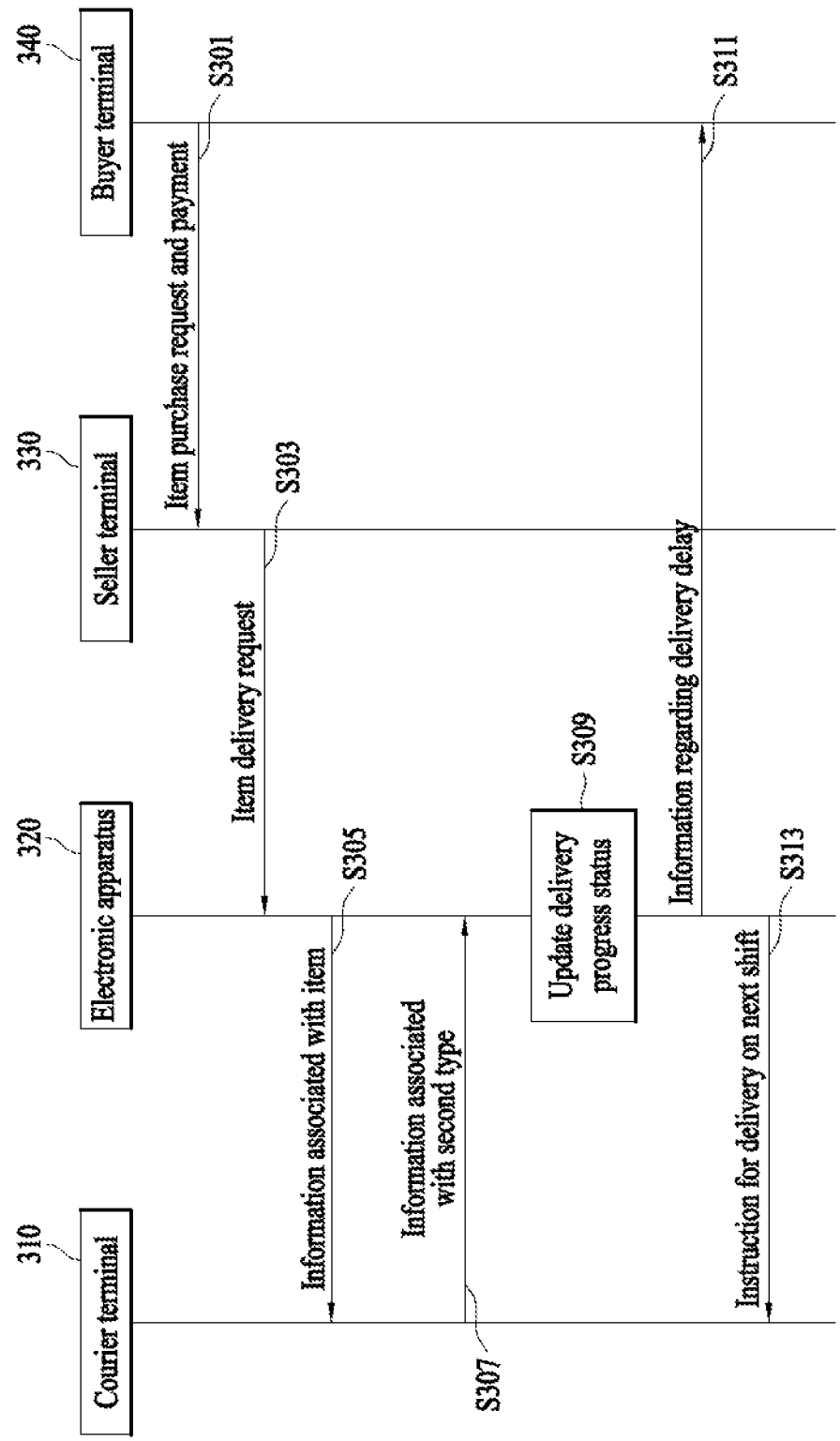
FIG. 3 is a flowchart illustrating a delivery status management method according to another embodiment.

FIG. 3 is a flowchart illustrating a delivery status management method according to another embodiment.

Referring to FIG. 3, in operation S301, a buyer terminal 340 may transmit an item purchase request and payment information to a seller terminal 330. Since the description of operation S201 of FIG. 2 is applicable to the description of operation S301, a repeated description will be omitted.

In operation S303, the seller terminal 330 may transmit to an electronic apparatus 320 a delivery request for the item which is paid. Since the description of operation S203 of FIG. 2 is applicable to the description of operation S303, a repeated description will be omitted.

In operation S305, the electronic apparatus 320 may transmit information associated with the item to a courier terminal 310. Since the description of operation S205 of FIG. 2 is applicable to the description of operation S305, a repeated description will be omitted.

In operation S307, the courier terminal 310 may transmit information associated with a second type to the electronic apparatus 320. Specifically, the courier who has identified the information associated with the item using the courier terminal 310 may deliver the item to a buyer using the associated information. At this point, the courier may input information associated with a delivery progress status of the item using the courier terminal 310, and the courier terminal 310 may transmit the received information to the electronic apparatus 320 through an application.

The information associated with the delivery progress status may include at least one of: information corresponding to a first type; information corresponding to a second type; or information corresponding to a third type. In this case, the information associated with the second type may include information corresponding to a case where delivery of the item is to be attempted again on a next shift. That is, when the information corresponding to the second type is input from the courier terminal 310, the courier may attempt to deliver the item again on the next shift. At this point, the information corresponding to the second type may include, for example, information indicating a case where the courier is not allowed to enter, information indicating a case where the courier has insufficient time to deliver the item, or information indicating a case where the courier has misclassified the items or misloaded the item (e.g., loaded a different or incorrect item). For example, the information corresponding to the second type may include: a case where the courier is not allowed to enter because an entrance password of a front door is not given by a buyer; a case where the courier is not allowed to enter because the entrance password filled by the buyer is a wrong password;

a case where a security guard is not present; a case where there is insufficient time left to deliver the item on a scheduled delivery date; or a case where the courier has misclassified or misloaded the item by mistaking a different item for the item which is paid.

In operation S309, the electronic apparatus 320 may update the delivery progress status based on the information received from the courier terminal 310. Specifically, the electronic apparatus 320 may update the delivery progress status of the item to a second status. Here, the second status may correspond to a state in which the delivery of the item is to be attempted again on the next shift because the item cannot be delivered on a scheduled delivery date. In this case, unlike the first type, when the delivery status corresponds to the second type, the electronic apparatus may not generate a return invoice for the item.

In operation S311, the electronic apparatus 320 may transmit information on or regarding a delivery delay to the buyer terminal 340. In this case, information associated with the second type input by the courier may be displayed through the buyer terminal 340, and the buyer may identify a reason for the delivery delay.

In operation S313, the electronic apparatus 320 may instruct the courier terminal 310 to redeliver the item on the next shift. In this case, the electronic apparatus 320 may transmit a redelivery instruction to the courier terminal 310 so that the item to be redelivered is delivered preferentially. For example, a mark to distinguish the item to be redelivered from other items may be shown on the courier terminal 310, so that the item to be redelivered is delivered preferentially.

Figure 4:
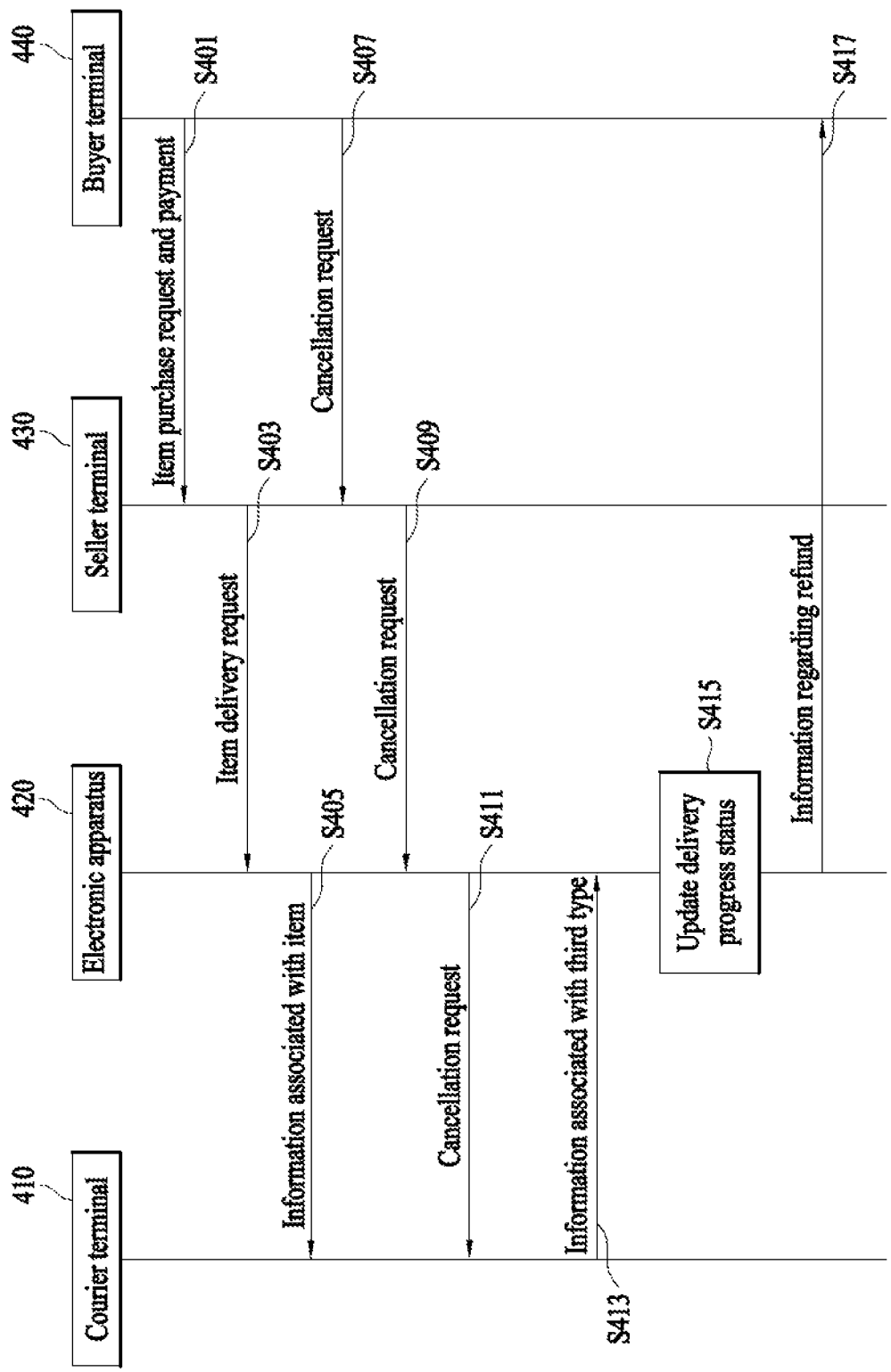
FIG. 4 is a flowchart illustrating a delivery status management method according to another embodiment.

FIG. 4 illustrates a flowchart of a delivery status management method according to another embodiment.

Referring to FIG. 4, in operation 401, a buyer terminal 440 may transmit an item purchase request and payment information to a seller terminal 430. Since the description of operation S201 of FIG. 2 is applicable to operation 401, a repeated description will be omitted.

In operation 403, the seller terminal 430 may transmit to an electronic apparatus 420 a delivery request for an item which is paid. Since the description of operation S203 of FIG. 2 is applicable to operation S403, a repeated description will be omitted.

In operation S405, the electronic apparatus 420 may transmit information associated with the item to a courier terminal 410. Since the description of operation S205 of FIG. 2 is applicable to operation S405, a repeated description will be omitted.

In operation S407, the buyer terminal 440 may transmit a cancellation request to the seller terminal 430, and, in operation S409, the seller terminal 430 may transmit the cancellation request to the electronic apparatus 420.

When the seller terminal or electronic apparatus receives the cancellation request, the seller terminal or electronic apparatus may automatically generate a return invoice for the canceled item. A return invoice generated in response to the above-described first type may be automatically generated upon receiving information associated with a delivery progress status of the item from the courier terminal, but a return invoice generated in response to the third type may be automatically generated upon receiving the cancellation request from the buyer, regardless of information received from the courier terminal.

In operation S411, when the item requested to cancel has been assigned to a courier, the electronic apparatus 420 may transmit the cancelation request to the courier terminal 410. In contrast, when the item requested to cancel has not yet to be assigned to the courier, the electronic apparatus 420 may transmit information on or regarding a refund due to a cancellation processing to the buyer terminal 440.

In operation S413, the courier terminal 410 may transmit information associated with the third type to the electronic apparatus 420. Specifically, the courier may input information associated with a delivery progress status of the item using the courier terminal 410, and the courier terminal 210 may transmit the input information to the electronic apparatus 220 through an application. The information associated with the delivery progress status may include at least one of: information corresponding to a first type; information corresponding to a second type; or information corresponding to a third type. In this case, the information corresponding to the third type may include information indicating a case where the item subject to the cancellation request in operation S411 is confirmed to be canceled by the courier before the item is delivered to the buyer. For example, when a courier receives the cancellation request using the courier terminal 410 and then enters confirmation of the cancellation of the item on the application, the information associated with the third type may be transmitted to the electronic apparatus 420. In this case, an interface partly different from interfaces responsive to the first type and the second type may be displayed on the courier terminal 410, which will be described in detail in FIG. 9 below.

In operation S415, the electronic apparatus 420 may update a delivery progress status based on the information received from the courier terminal 410. Specifically, the electronic apparatus 420 may update the delivery progress status of the item to a third status. Here, the third status may correspond to a state in which the delivery of the item is interrupted due to order cancellation.

In operation S417, the electronic apparatus 420 may perform a refund procedure for the item. No more delivery attempt is made when the delivery of the item is interrupted due to the order cancellation, and the electronic apparatus 420 may transmit information on or regarding a refund to the buyer terminal 440 through a refund guide message. For example, when cancellation confirmation in response to the cancellation request in operation S411 is input to the courier terminal 410 after the delivery is assigned to the courier, the buyer terminal 440 may receive information on the refund from the electronic apparatus 420. If the electronic apparatus 420 receives the cancellation request in operation S409 before the delivery is assigned to the courier, the buyer terminal 440 may receive the information on the refund from the electronic apparatus 420. Also, the electronic apparatus 420 may provide information for performing the refund procedure to the seller terminal 430.

Figure 5:
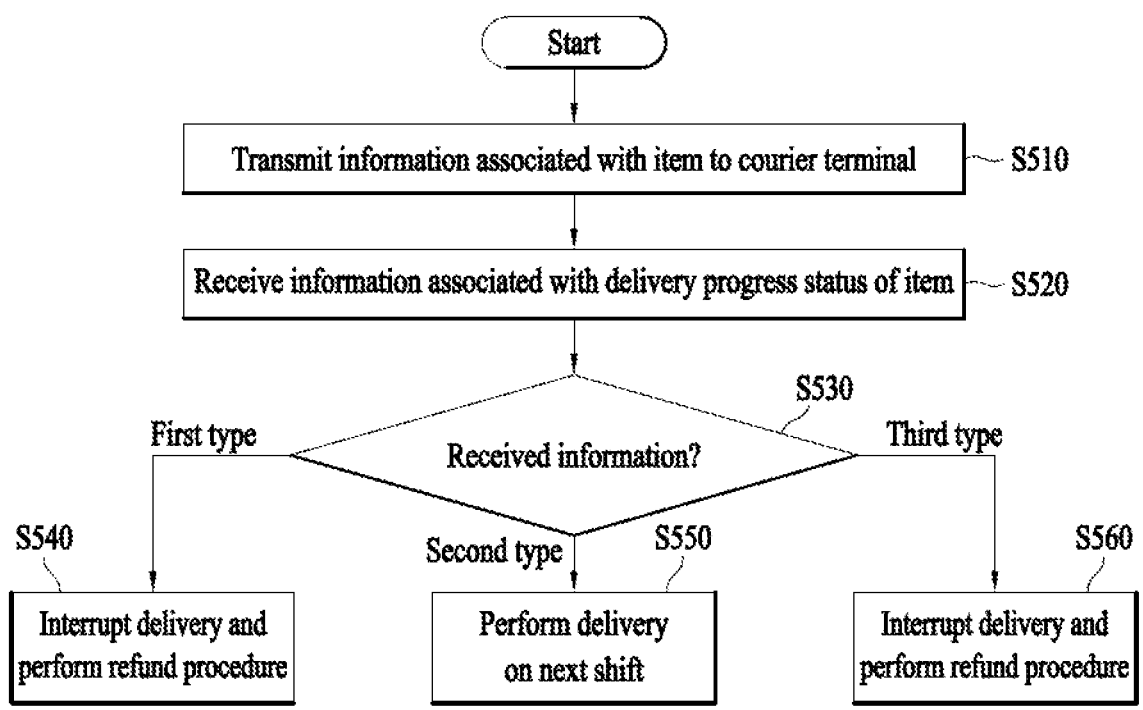
FIG. 5 is a flowchart illustrating a delivery status management method of an item by an electronic apparatus according to an embodiment.

FIG. 5 illustrates a flowchart of management of a delivery status of an item by an electronic apparatus according to an embodiment.

Referring to FIG. 5, in operation S510, the electronic apparatus may transmit information associated with an item to a courier terminal. Specifically, when a buyer makes a purchase request and payment for the item, a seller may identify associated information using a seller terminal, and the seller may transmit, using a seller terminal, to an electronic apparatus a delivery request for the item which is paid. In this case, the electronic apparatus is a device connected to the seller terminal to provide a delivery service for the item, and may transmit an invoice number to the seller terminal or a buyer terminal in response to the delivery request.

Here, a courier terminal is a terminal corresponding to a courier, and the courier may deliver the item to the buyer using the courier terminal. The electronic apparatus may determine a courier suitable for delivering the item requested to deliver from among a plurality of couriers, and may transmit information associated with the item to the courier terminal. In this case, the information associated with the item is information necessary to deliver the item and may include at least one of, for example, an invoice number, a delivery address, an address input by the customer, a buyer name, or a buyer contact number.

In operation S520, the electronic apparatus may receive information associated with a delivery progress status of the item. When delivering the item using the courier terminal, the courier may input the information associated with the delivery progress status of the item to the courier terminal, and the courier terminal may transmit the input information to the electronic apparatus through an application.

In this case, the information associated with the delivery progress status may include at least one of the following: information corresponding to a first type, information corresponding to a second type, or information corresponding to a third type.

Here, the information corresponding to the first type may include, for example, information indicating a case where the buyer has refused to receive a delivered item, a case where it is not possible to find a delivery address because of the delivery address of the item is a wrong address, or a case where the item cannot be delivered because the delivery address is in a restricted area although the delivery address of the item is found. In addition, the information corresponding to the second type may include, for example, information indicating a case where the courier is not allowed to enter, information indicating a case where the courier has insufficient time to deliver the item, or information indicating a case where the courier has misclassified or misloaded the item. In addition, the information corresponding to the third type may include information indicating a case where cancellation of the item subject to a cancellation request is confirmed by the courier before the item is delivered to the buyer.

In operation S530, the electronic apparatus may identify the received information.

In operation S540, when the received information corresponds to the first type, the electronic apparatus may update the delivery progress status to a first status. In this case, the first status may correspond to a state in which the delivery of the item is interrupted.

The electronic apparatus may identify the information received from the courier terminal to determine whether the received information corresponds to the first type.

According to an embodiment, the electronic apparatus may identify whether the received information corresponds to the first type, based on contents of the information received from the courier terminal. For example, the electronic apparatus may analyze the information associated with the delivery progress status, which is received from the courier terminal, and determine that a delivery address corresponds to a restricted area.

According to another embodiment, the electronic apparatus may determine whether the received information corresponds to the first type, based on a number of times of the information associated with the delivery progress status and/or a number of times of a screen displayed on the courier terminal. The electronic apparatus may identify whether the received information corresponds to the first type by comparing the number of times of the information associated with the delivery progress status and/or the number of times of a screen displayed on the courier terminal with a reference value. Using an application installed in the courier terminal, the electronic apparatus may monitor the number of times of the information associated with the delivery progress status and/or the number of times of a screen displayed on the courier terminal.

Figure 6:
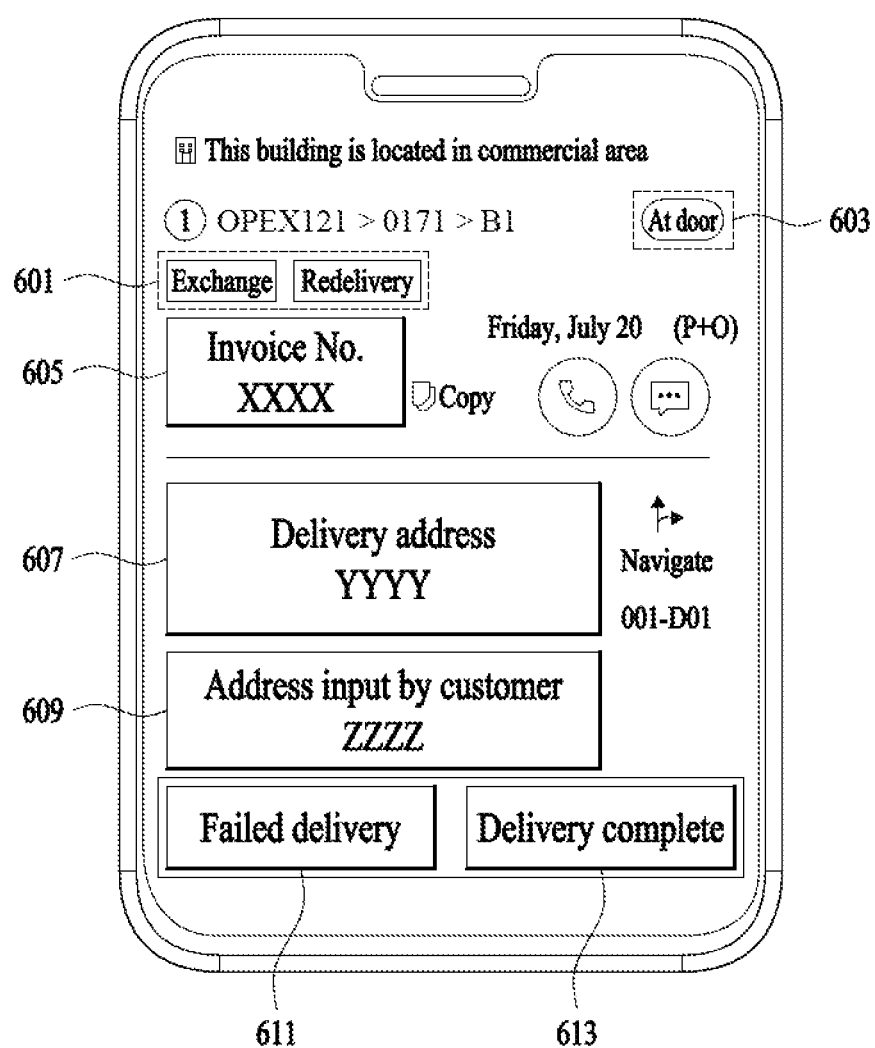
FIGS. 6 to 8 are diagrams illustrating contents according to an application, which are displayed on a courier terminal according to an embodiment.

For example, when the courier inputs a failed delivery button 611 on a first screen of FIG. 6 and input a failed delivery reason button 711 and a failed delivery processed button 715 on a second screen in a drawing 710, the electronic apparatus may receive information associated with a delivery progress status three times through the first screen and the second screen. When the number of times of the information associated with the delivery status and/or the number of times of a screen displayed on the courier terminal is greater than a first reference vale (e.g., 2) and less than a second reference value (e.g., 4), the electronic apparatus may determine that the information associated with the delivery progress status, which is received from the courier terminal, is a delivery delay corresponding to the second type and may instruct a redelivery on a next shift. In another example, when the courier inputs the failed delivery button 611 on the first screen of FIG. 6, inputs an other reason button 713 on the second screen in the drawing 710, inputs a wrong address button 721 on a third screen in a drawing 720, inputs a notification message 815 on a fourth screen in a drawing 810 and then inputs a failed delivery processed, the electronic apparatus may receive the information associated with the delivery progress status five times through the first to fourth screens. When the number of times of the information associated with the delivery status and/or the number of times of a screen displayed on the courier terminal is greater than the second reference value (e.g., 4), the electronic apparatus may determine that the information associated with the delivery progress status, which is received from the courier terminal, is a delivery delay corresponding to a second type and may proceed with a refund.

In operation S550, when the received information corresponds to the second type, the electronic apparatus may update the delivery progress status to a second status. Here, the second status may correspond to a state in which the delivery of the item is to be attempted again on the next shift because the item cannot be delivered on a scheduled delivery date. Meanwhile, in the embodiment, the delivery of the item may be performed on the next shift, but the present disclosure is not limited thereto, and a delivery process may be managed so that the delivery is performed by a different courier or at a different delivery time.

In operation S560, when the received information corresponds to a third type, the electronic apparatus may update the delivery progress status to a third status. Here, the third status may correspond to a state in which the delivery of the item is interrupted due to order cancellation.

Figure 7:
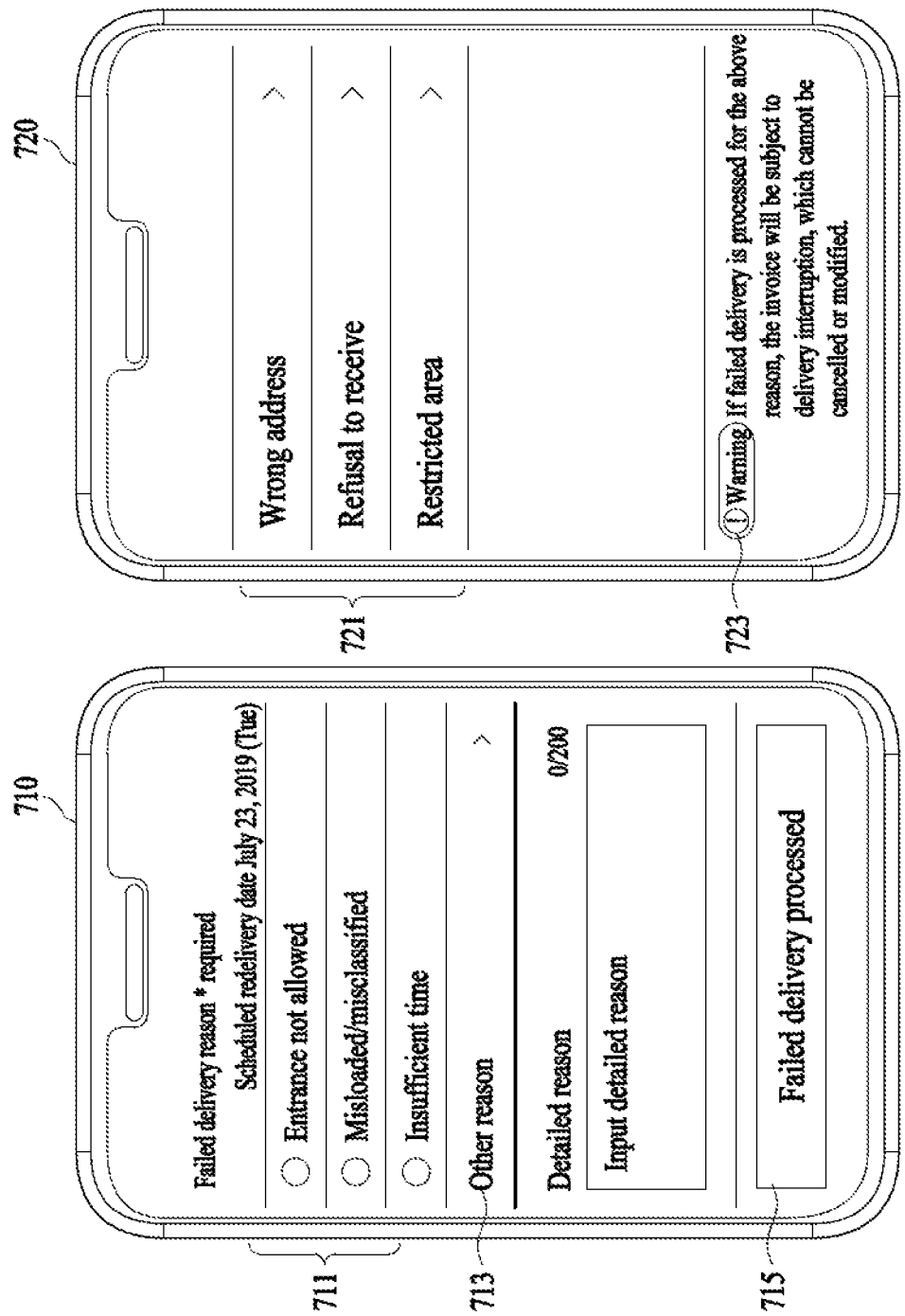
Figure 8:
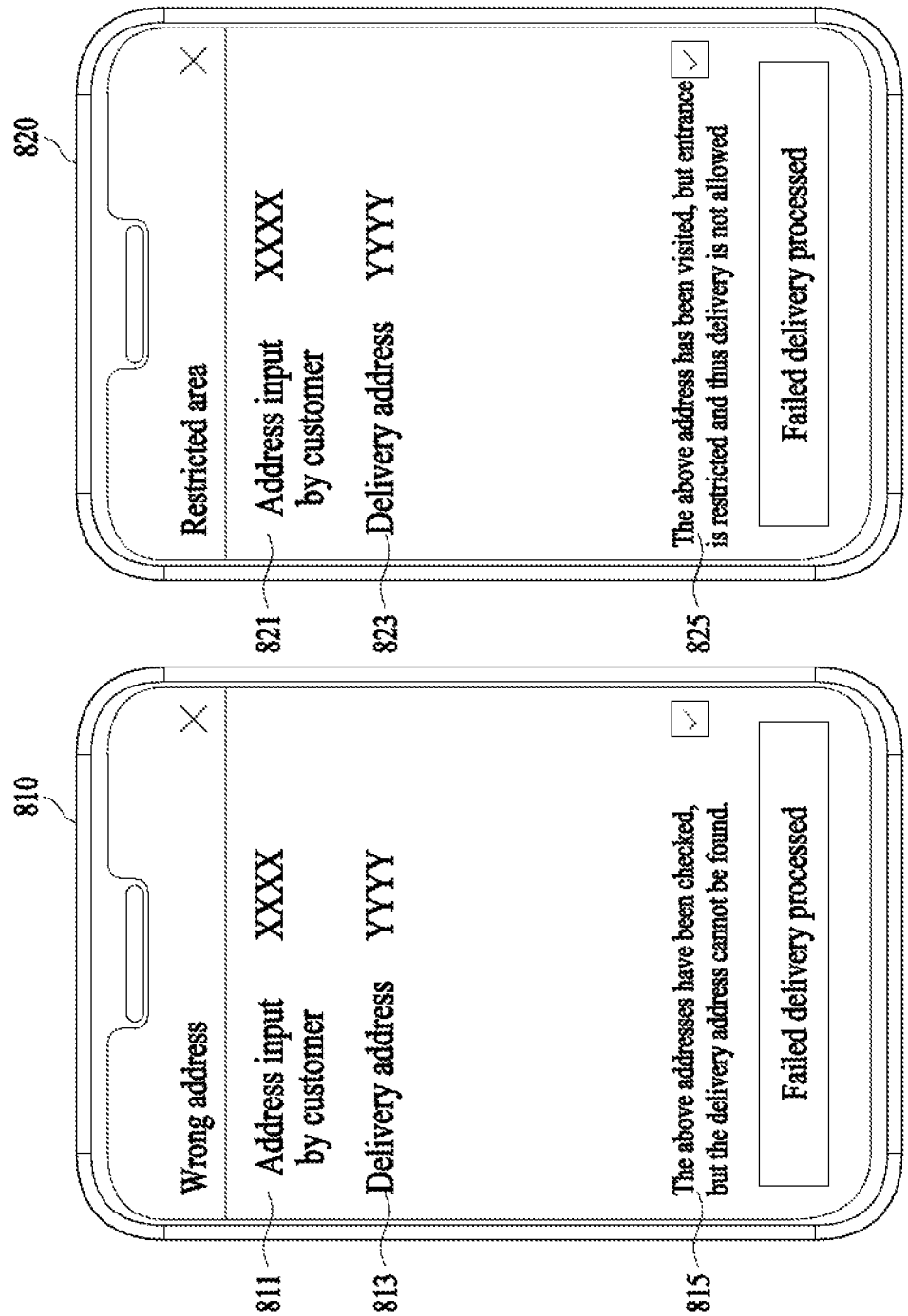

FIGS. 6 to 8 are diagrams illustrating contents according to an application, which are displayed on a courier terminal, according to an embodiment.

Referring to FIG. 6, an exchange/redelivery 601 indicates a notice regarding a delivery of an item. For example, when redelivery 601 is displayed, it indicates that a redelivery is to be attempted on a current shift because a delivery was failed on a previous shift. When the delivery progress status of the item is the second status, the redelivery 601 may be displayed. In another example, when exchange 601 is displayed, it indicates that an item delivered on a previous shift is to be exchanged with a different item on a current shift.

An invoice number XXXX 605 of the item to be delivered is displayed on the courier terminal. Here, the invoice number may be a unique number including information associated with all matters about shipping of the item. The buyer may inquire with the invoice number to identify the delivery status of the ordered item.

An address 609 is an address ZZZZ input by a customer, and represents an address input by a buyer through a buyer terminal. An address 607 is a delivery address YYYY, and represents an address determined based on the address ZZZZ input by the customer. For example, a road name address determined based on the address ZZZZ input by the customer may be the delivery address YYYY. In this case, the courier may use the delivery address YYYY for navigation to reach a destination.

A delivery location 603 requested by the customer may be displayed on the courier terminal, and a delivery location may be specified, for example, as a door front, a security office, a parcel locker, or the like. Accordingly, the courier may arrive at the delivery address and deliver the item to the delivery location 603 requested by the customer.

A delivery complete button 613 represents a button selected in response to completion of the delivery of the item at the delivery location of the delivery destination, and the delivery complete button may be selected by the courier on an application after the delivery is completed. Conversely, the failed delivery button 611 represents a button selected in response to incompletion of the delivery of the item, and the failed delivery button may be selected by the courier on the application when the delivery cannot be completed.

FIG. 7 illustrates a screen displayed when a courier selects the failed delivery button 611 according to an embodiment. When a delivery progress status corresponds to a first type or a second type, the failed delivery button 611 may be selected rather than the delivery complete button 613.

The drawing 710 indicates a screen displayed when the failed delivery button 611 is selected, and the drawing 720 indicates a screen displayed when "other reason" 713 is selected. As for the "other reason" 713, an input screen different from a screen responsive to the failed delivery reason 711 may be further displayed to call the courier's attention.

In the drawing 710, the failed delivery reason 711 may correspond to the second type described above, and the "other reason" 713 may correspond to the first type described above. According to information corresponding to the first type, unlike information corresponding to the second type, interruption of the delivery and a refund procedure may be proceeded with, and therefore, the courier may need to be alert. Accordingly, information associated with a delivery progress status corresponding to the first type may be selected by the courier on an input screen in the courier terminal, the screen which is different from a screen for a delivery progress status corresponding to the second type. For example, when insufficient time corresponding to the second type is selected in the drawing 710 and the failed delivery processed button 715 is selected, a redelivery may be performed on a next shift. However, when the "other reason" 713 is selected in the drawing 710, the drawing 720 which is a different input screen may be further displayed.

In the drawing 720, the failed delivery reason 721 may correspond to the first type described above, and a notification message 723 may be displayed to call the courier's attention. The notification message 723 is used to call the courier's attention because delivery interruption, and a refund process is proceeded with when the failed delivery reason 721 is selected.

Referring to FIG. 8, the drawing 810 indicates an input screen appearing when a wrong address is selected in the drawing 720, and a drawing 820 indicates an input screen appearing when a restricted area is selected in the drawing 720. As for a wrong address and a restricted area, an input screen is displayed to call the courier's attention and ask for double check, as in the drawings 810 and 820.

In this case, as for the wrong address and the restricted area, delivery address information for an item may be input on the displayed screen. The delivery address information may include an address 811, 821 input by the customer and a delivery address 813, 823. In the drawings 810 and 820, a notification message 815, 825 may be displayed to call the courier's attention.

According to an embodiment, when the courier cannot complete the delivery of the item, the failed delivery button 611 may be selected in the courier terminal. When a reason for the failed delivery is information corresponding to the first type 713, the information corresponding to the first type may be selected on a screen different from an input screen on which information corresponding to the second type 711 is to be input. For example, the information corresponding to the second type 711 may be selected and processed on the screen of the drawing 710, and the information corresponding to the first type 713 may be selected on the screen of the drawing 720, the screen which is displayed when the "other reason" button is selected in the drawing 710. When the wrong address is selected, the failed delivery may be processed 815 on a screen of the drawing 810 where the delivery address information for the item is displayed, and when the restricted area is selected, the failed delivery may be processed 825 on a screen of the drawing 820 where the delivery address information for the item is displayed.

According to another embodiment, when the courier delivers the item to a delivery location at a delivery address, the delivery complete button 613 may be selected in the courier terminal.

Figure 9:
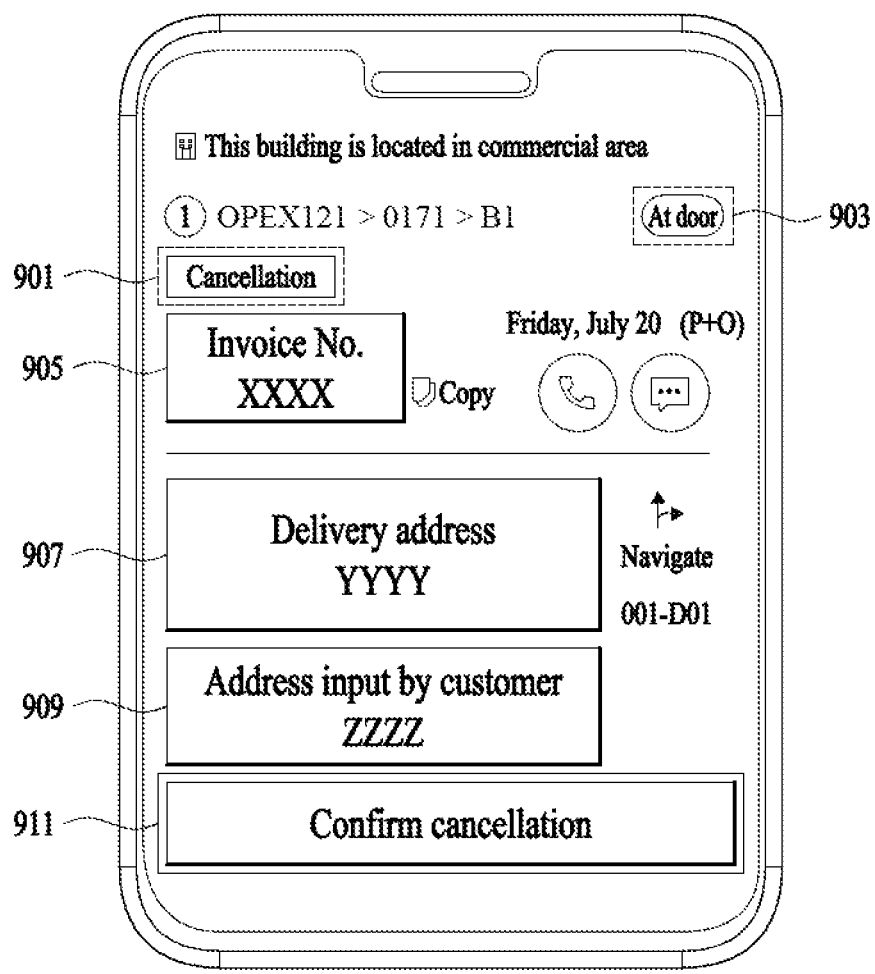
FIG. 9 is a diagram illustrating contents according to an application, which are displayed on a courier terminal according to another embodiment.

FIG. 9 is a diagram illustrating contents according to an application, which are displayed on a courier terminal according to another embodiment.

Referring to FIG. 9, cancellation 901 indicates that a cancellation request for an item is received. Specifically, when a buyer terminal transmits a cancellation request for an item to a seller terminal, the seller terminal may transmit the cancellation request to an electronic apparatus for managing a delivery status. In order to suspend a delivery of the item subject of which an order is cancelled, the cancellation 901 may be displayed on a courier terminal, unlike FIG. 6. Accordingly, the courier may not deliver the item of which the order is cancelled to the buyer.

When order cancellation 901 is received, a cancellation confirmation button 911 may be displayed rather than the failed delivery button 611 or the delivery complete button 613. When the order cancellation is received at the electronic apparatus, the courier terminal may display only the cancellation confirmation button 911, so that the courier cannot accidentally select the failed delivery button or the delivery completion button. When the cancellation confirmation 911 is selected by the courier, the courier terminal may transmit information corresponding to the above-described third type to the electronic apparatus, and interruption of the delivery and a refund procedure may be proceeded with.

Since the description about a delivery location 903, an invoice number 905, a delivery address 907, and an address 909 input by the customer of FIG. 9 are the same as the description of FIG. 6, a repeated description will be omitted.

Figure 10:
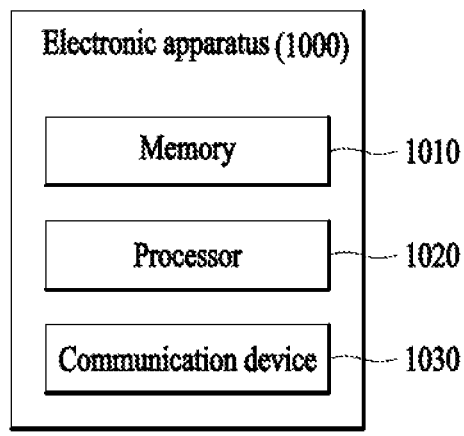
FIG. 10 is a block diagram of an electronic apparatus according to an embodiment.

FIG. 10 illustrates a block diagram of an electronic apparatus according to an embodiment.

Referring to FIG. 10, an electronic apparatus 1000 may include at least one of a memory 1010, a processor 1020, or a communication device 1030. In the electronic apparatus 1000 illustrated in FIG. 10, only elements related to the present embodiment are illustrated. Therefore, those of ordinary skill in the technical field related to the present embodiment will appreciate that general-purpose elements other than the elements shown in FIG. 10 may be further included.

The communication device 1030 may communicate with an external device. The external device may be a terminal or a server. In addition, a communication technology used by the communication device 1030 include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The communication device 1030 may receive buyer information, which is involved in a delivery request for an item, and a cancellation request. In addition, the communication device 1030 may receive an invoice number associated with the item requested to deliver.

The processor 1020 may control overall operations of the electronic apparatus 1000 and may process data and signals. The processor 1020 may be configured as at least one hardware unit. In addition, the processor 1020 may operate as one or more software modules generated by executing program codes stored in the memory 1010.

As described above, the processor 1020 may perform an operation for managing a delivery status.

Figure 11:
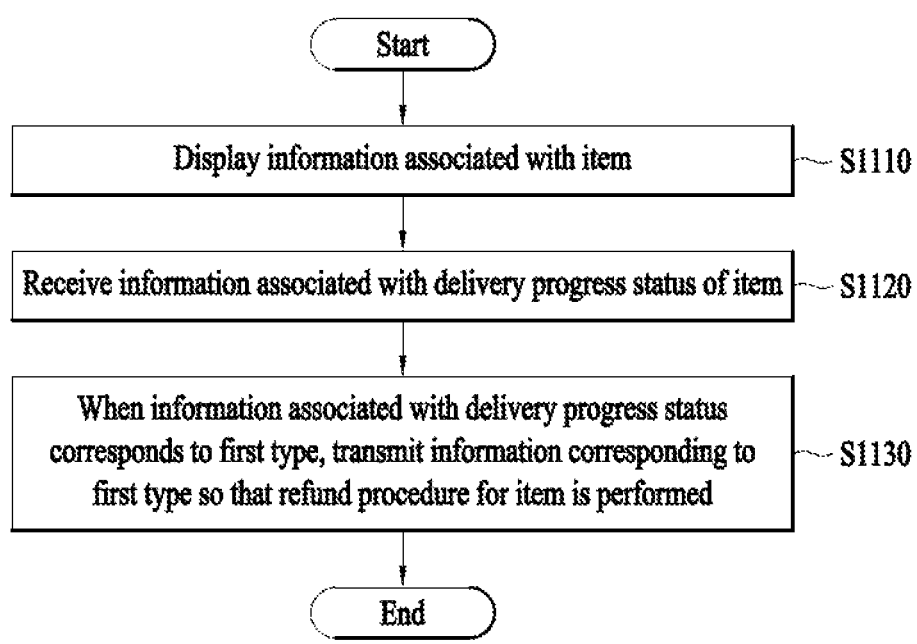
FIG. 11 is a flowchart of a delivery status management method performed by a courier terminal according to an embodiment.

FIG. 11 is a flowchart of a delivery status management method performed by a courier terminal according to an embodiment.

In operation S1110, the courier terminal may display information associated with an item. The courier terminal may receive the information associated with the item from an electronic apparatus. In this case, the information related to the item may include, for example, at least one of an invoice number or buyer information.

In operation S1120, the courier terminal may receive information associated with a delivery progress status of the item. Specifically, the information associated with the delivery progress status of the item may include at least one of: information corresponding to the first type; information corresponding to the second type; or information corresponding to the third type. In this case, the information corresponding to the first type may include information associated with an interrupted delivery of the item. The information corresponding to the second type may include information corresponding to a case where the delivery of the item is attempted again on a next shift. The information corresponding to the third type may include information indicating a case where cancellation of the item subject to a cancellation request is confirmed by the courier before the item is delivered to a buyer.

In operation S1130, when the information associated with the delivery progress status corresponds to the first type, the courier terminal may transmit the information corresponding to the first type to the electronic apparatus, so that a refund procedure for the item is performed.

In addition, when the information associated with the delivery progress status corresponds to the second type, the courier terminal may transmit the information corresponding to the second type to the electronic apparatus, so that the item is to be delivered on the next shift. In addition, when the information associated with the delivery progress status corresponds to the third type, the courier terminal may transmit the information corresponding to the third type to the electronic apparatus, so that a refund procedure for the item is proceeded with.

The apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. Those terms may include software routines in conjunction with processors, etc.

The above-described embodiments are only examples, and other embodiments may be implemented within the scope of the following claims.

What is claimed is:

1. A delivery status management method performed by an electronic apparatus, the method comprising:
   selecting a courier of a plurality of couriers to deliver an item based on obtaining a request for delivery of the item, wherein a buyer terminal is configured to transmit purchase information for the item to a seller terminal, and wherein the seller terminal is configured to transmit the request for delivery of the item to the electronic apparatus;
   providing, to a courier terminal corresponding to the courier, an application associated with the item, wherein the application is configured to cause display of one or more screens on the courier terminal;

receiving, from the courier terminal, information associated with a delivery progress status of the item;
determining a number of displays of the one or more screens by the application on the courier terminal based on the information associated with the delivery progress status of the item, wherein each display of the one or more screens is indicative of a failure to deliver the item;
comparing the number of displays of the one or more screens with a plurality of sets of reference values, wherein each of the plurality of sets of reference values corresponds to a particular response type of a plurality of response types, each response type of the plurality of response types indicative of a distinct reason for the failure to deliver the item and identifying a distinct response to the failure to deliver the item;
based on the number of displays of the one or more screens being less than a first set of reference values of the plurality of sets of reference values, determining the delivery progress status of the item corresponds to a first response type of the plurality of response types;
in response to the delivery progress status of the item corresponding to the first response type, performing a redelivery procedure for the item;
based on the number of displays of the one or more screens exceeding the first set of reference values of the plurality of sets of reference values, determining the delivery progress status of the item corresponds to a second response type of the plurality of response types;
in response to the delivery progress status of the item corresponding to the second response type, automatically performing a refund procedure for the item, wherein automatically performing the refund procedure for the item comprises:
  instructing the courier terminal to process the item based on the delivery progress status of the item corresponding to the second response type, wherein, in response to the instructing of the courier terminal, the courier terminal schedules a return of the item based on the second response type,
  executing, by the electronic apparatus, the application to obtain first location information from a location sensor in the courier terminal, the first location information being indicative of a location of the courier terminal,
  comparing, by the electronic apparatus, the first location information and second location information, the second location information being indicative of the location of the item,
  causing, by the electronic apparatus, the courier terminal to provide vibrational feedback or audio feedback to the courier based on comparing the first location information and the second location information and identifying that a distance between the first location information and the second location information is increasing, and
  confirming, by the electronic apparatus, that the courier obtained the item based on the first location information and the second location information subsequent to causing the courier terminal to provide the vibrational feedback or the audio feedback to the courier; and
causing display of first refund information regarding the refund procedure at the buyer terminal and second refund information regarding the refund procedure at the seller terminal, wherein the first refund information is indicative of a reason for a refund and the second refund information is indicative of performance of the refund procedure based on confirming that the courier obtained the item.

2. The delivery status management method of claim 1, wherein the delivery progress status of the item identifies one or more of:
  a buyer has refused to receive the item;
  a delivery address of the item is a wrong address; or
  the delivery address of the item corresponds to a restricted area.

3. The delivery status management method of claim 1, wherein instructing the courier terminal to process the item based on the delivery progress status of the item corresponding to the second response type comprises causing display, by the application on the courier terminal, information identifying the second response type, wherein delivery address information of the item is displayed by the application on the courier terminal.

4. The delivery status management method of claim 1, wherein the first refund information comprises order information or a refund period.

5. The delivery status management method of claim 1, wherein instructing the courier terminal to process the item comprises causing display, by the application on the courier terminal, of an instruction for the courier to collect the item.

6. The delivery status management method of claim 1, wherein the item comprises a first item, wherein determining the delivery progress status of the first item corresponds to the first response type is further based on obtaining input via a first input screen of the application on the courier terminal, wherein the first input screen is different from a second input screen, wherein a delivery progress status of a second item corresponds to the second response type based on obtaining input via the second input screen of the application on the courier terminal.

7. The delivery status management method of claim 1, wherein the item comprises a first item and the number of displays of the one or more screens comprises a first number of displays of the one or more screens, the delivery status management method further comprising:
  selecting the courier to deliver a second item based on obtaining a request for delivery of the second item, wherein the buyer terminal is configured to transmit purchase information for the second item to the seller terminal, and wherein the seller terminal is configured to transmit the request for delivery of the second item to the electronic apparatus, wherein the application is configured to cause display of the one or more screens on the courier terminal;
  receiving, from the courier terminal, information associated with a delivery progress status of the second item;
  determining a second number of displays of the one or more screens by the application on the courier terminal based on the information associated with the delivery progress status of the second item, wherein each display of the one or more screens is indicative of a failure to deliver the second item;
  comparing the second number of displays of the one or more screens with the plurality of sets of reference values;
  based on the second number of displays of the one or more screens exceeding a second set of reference values of the plurality of sets of reference values, determining the delivery progress status of the item corresponds to a third response type of the plurality of response types;

in response to the delivery progress status of the second item corresponding to the third response type, processing the second item to be delivered on a next shift; and
instructing the courier terminal to process the second item based on the delivery progress status of the second item corresponding to the third response type, wherein, in response to the instructing of the courier terminal, the courier terminal schedules a redelivery of the second item based on the third response type.

8. The delivery status management method of claim 7, wherein the delivery progress status of the second item identifies one or more of:
the courier is not allowed to enter;
the courier has insufficient time to deliver the second item; or
the courier has misclassified one or more items or loaded a different item.

9. The delivery status management method of claim 1, wherein the item comprises a first item and the number of displays of the one or more screens comprises a first number of displays of the one or more screens, the delivery status management method further comprising:
selecting the courier to deliver a second item based on obtaining a request for delivery of the second item, wherein the buyer terminal is configured to transmit purchase information for the second item to the seller terminal, and wherein the seller terminal is configured to transmit the request for delivery of the second item to the electronic apparatus, wherein the application is configured to cause display of the one or more screens on the courier terminal;
receiving, from the courier terminal, information associated with a delivery progress status of the second item;
determining a second number of displays of the one or more screens by the application on the courier terminal based on the information associated with the delivery progress status of the second item, wherein each display of the one or more screens is indicative of a failure to deliver the second item;
comparing the second number of displays of the one or more screens with the plurality of sets of reference values;
based on the second number of displays of the one or more screen exceeding a second set of reference values of the plurality of sets of reference values, determining the delivery progress status of the item corresponds to a third response type of the plurality of response types; and
in response to the delivery progress status of the second item corresponding to the third response type, performing a refund procedure for the second item;
wherein the delivery progress status of the second item corresponding to the third response type identifies the courier has confirmed a delivery cancellation of the second item by a buyer prior to delivery of the second item to the buyer.

10. The delivery status management method of claim 1, wherein determining the delivery progress status of the item corresponds to the second response type of the plurality of response types is further based on the number of displays of the one or more screens being less than a second set of reference values of the plurality of sets of reference values.

11. A delivery status management method performed by a courier terminal, wherein the courier terminal corresponds to a courier of a plurality of couriers, wherein the courier is selected via an electronic apparatus to deliver an item, the delivery status management method comprising:
based on the electronic apparatus selecting the courier to deliver the item, receiving an application associated with the item from the electronic apparatus, wherein the application is configured to cause display of one or more screens, wherein the electronic apparatus is configured to provide the application to the courier terminal based on receiving an item delivery request from a seller terminal;
displaying the application via a display of the courier terminal;
receiving information associated with a delivery progress status of the item;
determining a number of displays of the one or more screens by the application on the courier terminal based on the information associated with the delivery progress status of the item, wherein each display of the one or more screens is indicative of a failure to deliver the item;
comparing the number of displays of the one or more screens with a plurality of sets of reference values, wherein each of the plurality of sets of reference values corresponds to a particular response type of a plurality of response types, each response type of the plurality of response types indicative of a distinct reason for the failure to deliver the item and identifying a distinct response to the failure to deliver the item;
based on the number of displays of the one or more screens being less than a first set of reference values of the plurality of sets of reference values, determining the delivery progress status of the item corresponds to a first response type of the plurality of response types;
in response to the delivery progress status of the item corresponding to the first response type, transmitting information corresponding to the first response type to the electronic apparatus so that a redelivery procedure for the item is performed;
based on the number of displays of the one or more screens exceeding the first set of reference values of the plurality of sets of reference values, determining the delivery progress status of the item corresponds to a second response type of the plurality of response types;
in response to the delivery progress status of the item corresponding to the second response type, transmitting information corresponding to the second response type to the electronic apparatus so that a refund procedure for the item is automatically performed, wherein the electronic apparatus executes the application to obtain first location information from a location sensor in the courier terminal, wherein automatically performing the refund procedure for the item comprises:
transmitting, to the electronic apparatus, the first location information from a location sensor in the courier terminal, the first location information being indicative of a location of the courier terminal, wherein the electronic apparatus is configured to compare the first location information and second location information, the second location information being indicative of the location of the item, and
providing vibrational feedback or audio feedback to the courier based on the electronic apparatus comparing the first location information and the second location information and identifying a difference between the first location information and the second location information, wherein the electronic apparatus confirms that the courier obtained the item based on the first location information and the second location information subsequent to causing the courier terminal to provide the vibrational feedback or the audio feedback to the courier, wherein the electronic apparatus is configured to cause display of first refund information regarding the refund procedure at a buyer terminal and second refund information regarding the refund procedure at the seller terminal, wherein the first refund information is indicative of a reason for a refund and the second refund information is indicative of performance of the refund procedure; and processing the item based on the delivery progress status of the item corresponding to the first response type, wherein, to process the item, the courier terminal schedules a return of the item based on the first response type.

12. The delivery status management method of claim 11, wherein the delivery progress status of the item identifies one or more of:

a buyer has refused to receive the item;

a delivery address of the item is a wrong address; or the delivery address of the item corresponds to a restricted area.

13. The delivery status management method of claim 11, wherein the item comprises a first item, wherein the item delivery request comprises a first item delivery request, wherein the number of displays of the one or more screens comprises a first number of displays of the one or more screens, the delivery status management method further comprising:

based on the electronic apparatus selecting the courier to deliver a second item, receiving the application from the electronic apparatus, wherein the electronic apparatus is configured to provide the application to the courier terminal based on receiving a second item delivery request from the seller terminal;

receiving information associated with a delivery progress status of the second item determining a second number of displays of the one or more screens by the application on the courier terminal based on the information associated with the delivery progress status of the second item, wherein each display of the one or more screens is indicative of a failure to deliver the second item;

comparing the second number of displays of the one or more screens with the plurality of sets of reference values;

based on the second number of displays of the one or more screen exceeding a second set of reference values of the plurality of sets of reference values, determining the delivery progress status of the item corresponds to a third response type of the plurality of response types; and in response to the delivery progress status of the second item corresponding to the third response type, transmitting information corresponding to the third response type to the electronic apparatus so that the second item is delivered on a next shift, wherein the delivery progress status of the second item corresponding to the third response type identifies one or more of:

the courier is not allowed to enter;

the courier has insufficient time to deliver the second item; or the courier has misclassified one or more items or loaded a different item.

14. The delivery status management method of claim 11, wherein the item comprises a first item, wherein the item delivery request comprises a first item delivery request, wherein the number of displays of the one or more screens comprises a first number of displays of the one or more screens, the delivery status management method further comprising:

based on the electronic apparatus selecting the courier to deliver a second item, receiving the application from the electronic apparatus, wherein the electronic apparatus is configured to provide the application to the courier terminal based on receiving a second item delivery request from the seller terminal;

receiving information associated with a delivery progress status of the second item;

determining a second number of displays of the one or more screens by the application on the courier terminal based on the information associated with the delivery progress status of the second item, wherein each display of the one or more screens is indicative of a failure to deliver the second item;

comparing the second number of displays of the one or more screens with the plurality of sets of reference values;

based on the second number of displays of the one or more screen exceeding a second set of reference values of the plurality of sets of reference values, determining the delivery progress status of the item corresponds to a third response type of the plurality of response types; and in response to the delivery progress status of the second item corresponding to the third response type, transmitting information corresponding to the third response type to the electronic apparatus so that a refund procedure for the second item is performed, wherein the delivery progress status of the second item corresponding to the third response type identifies the courier has confirmed a delivery cancellation of the second item by a buyer prior to delivery of the second item to the buyer.

* * * * *